US005263768A

United States Patent [19]

Scheulderman

[11] Patent Number: 5,263,768

[45] Date of Patent: Nov. 23, 1993

[54] WHEELCHAIR WITH AN IMPROVED ADJUSTABLE BACKREST

[75] Inventor: Petrus J. Scheulderman, Almere, Netherlands

[73] Assignee: Richard Van Seenus Nederland B.V., Almere, Netherlands

[21] Appl. No.: 891,702

[22] Filed: Jun. 1, 1992

[30] Foreign Application Priority Data

Jun. 17, 1991 [NL] Netherlands ........................ 9101039

[51] Int. Cl.[5] ............................................... B60N 2/02

[52] U.S. Cl. ........................ 297/362.13; 297/DIG. 4; 297/354.12

[58] Field of Search ................. 297/361, 355, DIG. 4, 297/298; 280/250.1

[56] References Cited

U.S. PATENT DOCUMENTS 3,185,495 5/1965 Pivacek ........................ 280/250.1 X
3,427,073 2/1969 Downs et al. ....................... 297/361
4,787,673 11/1988 Locher ........................... 297/361 X
5,011,175 4/1991 Nicholson et al. ....... 297/DIG. 4 X
5,181,762 1/1993 Beumer .................... 297/DIG. 4 X

FOREIGN PATENT DOCUMENTS 1513426 2/1968 France .
2155717 5/1973 France .
1401866 6/1975 United Kingdom .
2126476 3/1984 United Kingdom ................ 297/361

*Primary Examiner*—James R. Brittain
*Assistant Examiner*—Milton Nelson, Jr.
*Attorney, Agent, or Firm*—Lorusso & Loud

[57] ABSTRACT

A wheelchair comprises a backrest, a base frame and a rod assembly connecting the backrest with the base frame. The rod assembly includes at both sides of the backrest a support rod pivotably coupled with the base frame for adjusting the angle of inclination of the backrest. A locking mechanism is provided for locking the backrest in a desired position. For each support rod a pair of tubes is provided having an inner tube telescopically slidable in an outer tube. The free ends of the pair of tubes are rotatably connected with upper and lower supports, respectively, which supports are connected fixedly and rotatably, respectively, with the corresponding support rod. A gas spring is mounted in each outer tube, which gas spring is connected with the inner tube at one side and with the outer tube at the other side. The actuating pin of the gas spring is operable through an actuating lever pivotably supported at its free end in the outer tube.

11 Claims, 3 Drawing Sheets

18
8
10
15
8
23
22
12
14
21
20
19
10
18
17

WHEELCHAIR WITH AN IMPROVED ADJUSTABLE BACKREST

BACKGROUND OF THE INVENTION

The invention relates to a wheelchair, comprising a backrest, a base frame and a rod assembly connecting the backrest with the base frame, said rod assembly including at both sides of the backrest a support rod pivotably coupled with the base frame for adjusting the angle of inclination of the backrest, wherein locking means are provided for locking the backrest in a desired position.

Such wheelchairs are known in different embodiments. In a known embodiment the locking means comprises for example a spring mechanism which has to be actuated by means of cables from the pushing handgrips of the wheelchair. A separate mechanism is required to swing down the backrest upon the seat of the wheelchair. Moreover a further gas spring has to be provided if a compensation is required for the forces exerted on the backrest by the user of the wheelchair.

The invention aims to provide a wheelchair of the above-mentioned type with an improved rod assembly for the backrest.

SUMMARY OF THE INVENTION

To this end the wheelchair according to the invention comprises a pair of tubes for each support rod, said pair of tubes having an inner tube telescopically slidable in an outer tube, wherein the free ends of the pair of tubes are rotatably connected with upper and lower supports, respectively, which supports are connected fixedly and rotatably, respectively, with the corresponding support rod, wherein a gas spring is mounted in each outer tube, which gas spring is connected with the inner tube at one side and with the outer tube at the other side and wherein the actuating pin of the gas spring is operable through an actuating lever pivotably supported at its free end in the outer tube.

In this manner a wheelchair is obtained wherein a telescopic adjusting mechanism with a gas spring accommodated in the same is added to each support rod, so that a relatively simple and robust construction is obtained. The gas spring being part of the adjusting mechanism is also adapted to receive the forces exerted on the backrest so that the backrest can be adjusted in an easy manner.

In order to obtain a favourable transfer of the forces in the effective adjustment range of the backrest, it is preferred that each support rod is rotatably connected with the lower support by means of a bracket directed away from the rotatable connection point of the corresponding pair of tubes.

In this case the bracket is preferably U-shaped, wherein the legs of the U-bracket are rotatably connected with the lower support and wherein the distance between said legs is at least equal to the diameter of the outer tube.

Thereby the backrest can be fully swung down upon the seat of the wheelchair without any auxiliary locking mechanism.

According to a favourable embodiment each pair of tubes is adapted to be mounted between the upper and lower supports with the actuating lever at the upper or lower sides, respectively. Thereby the wheelchair can be made as desired for operation of the adjustment of the backrest by the user of the wheelchair himself or by a third person pushing the wheelchair.

BRIEF DESCRIPTION OF THE DRAWINGS

The invention will be further explained by reference to the drawings in which an embodiment of the wheelchair according to the invention is schematically shown.

DETAILED DESCRIPTION OF A PREFERRED EMBODIMENT

Figure 1:
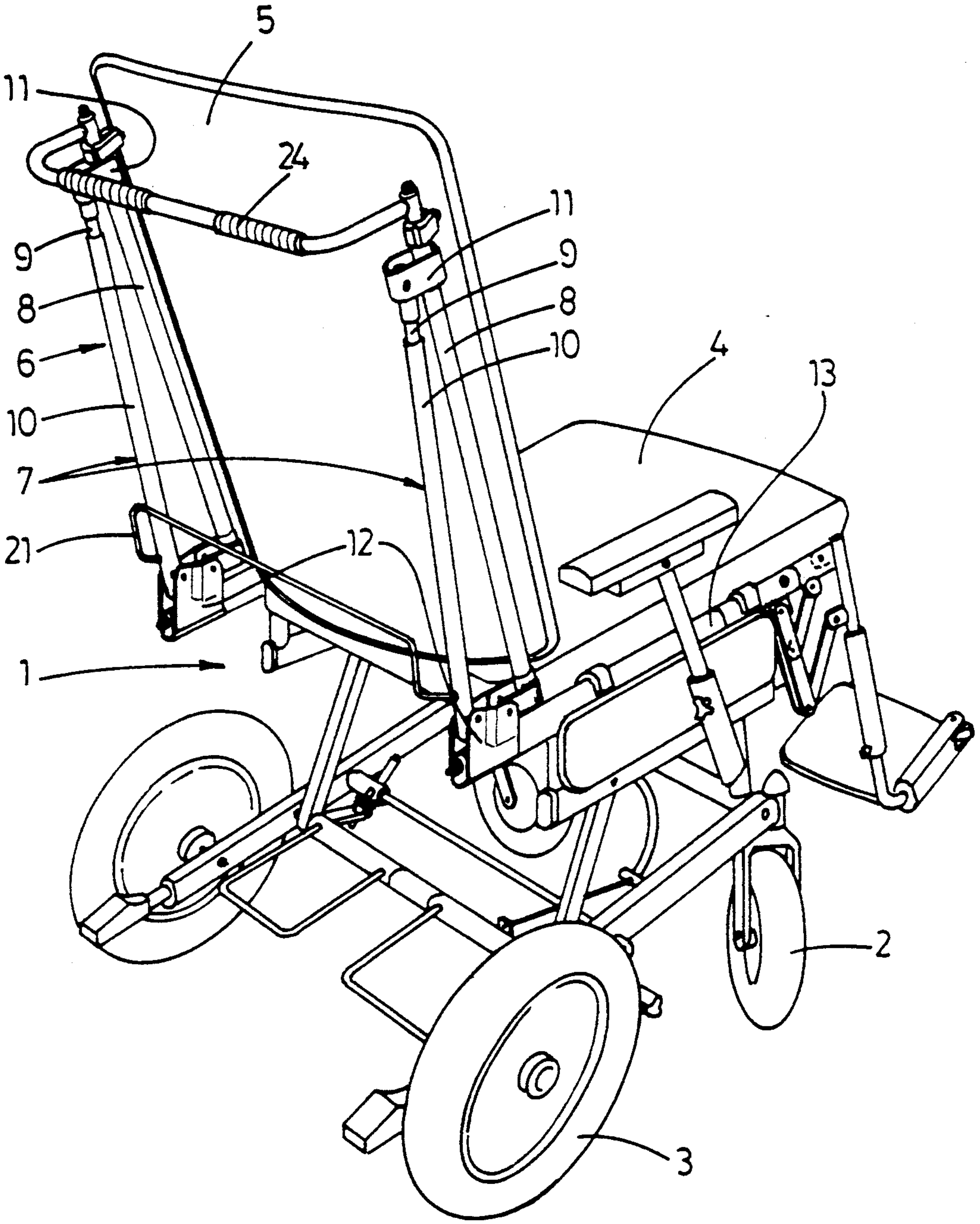
FIG. 1 shows a perspective view of an embodiment of the wheelchair according to the invention.

FIG. 1 shows a perspective view of a wheelchair comprising a base frame 1 with two swivel castors 2 at the front side and two wheels 3 at the rear side. A seat 4 is mounted on the base frame 1 and a backrest 5 is pivotably coupled with the base frame 1 by means of a rod assembly 6, so that the angle of inclination of the backrest 5 can be adjusted.

The rod assembly 6 comprises a construction unit 7 at both sides of the backrest 5, said construction unit 7 including a support rod 8, a pair of tubes 9, 10, an upper support 11 and a lower support 12. Such a construction unit is shown in FIG. 2 in two positions, wherein a detail of FIG. 2 at the location of the lower support 12 is shown in FIG. 3 at a larger scale.

Figure 2:
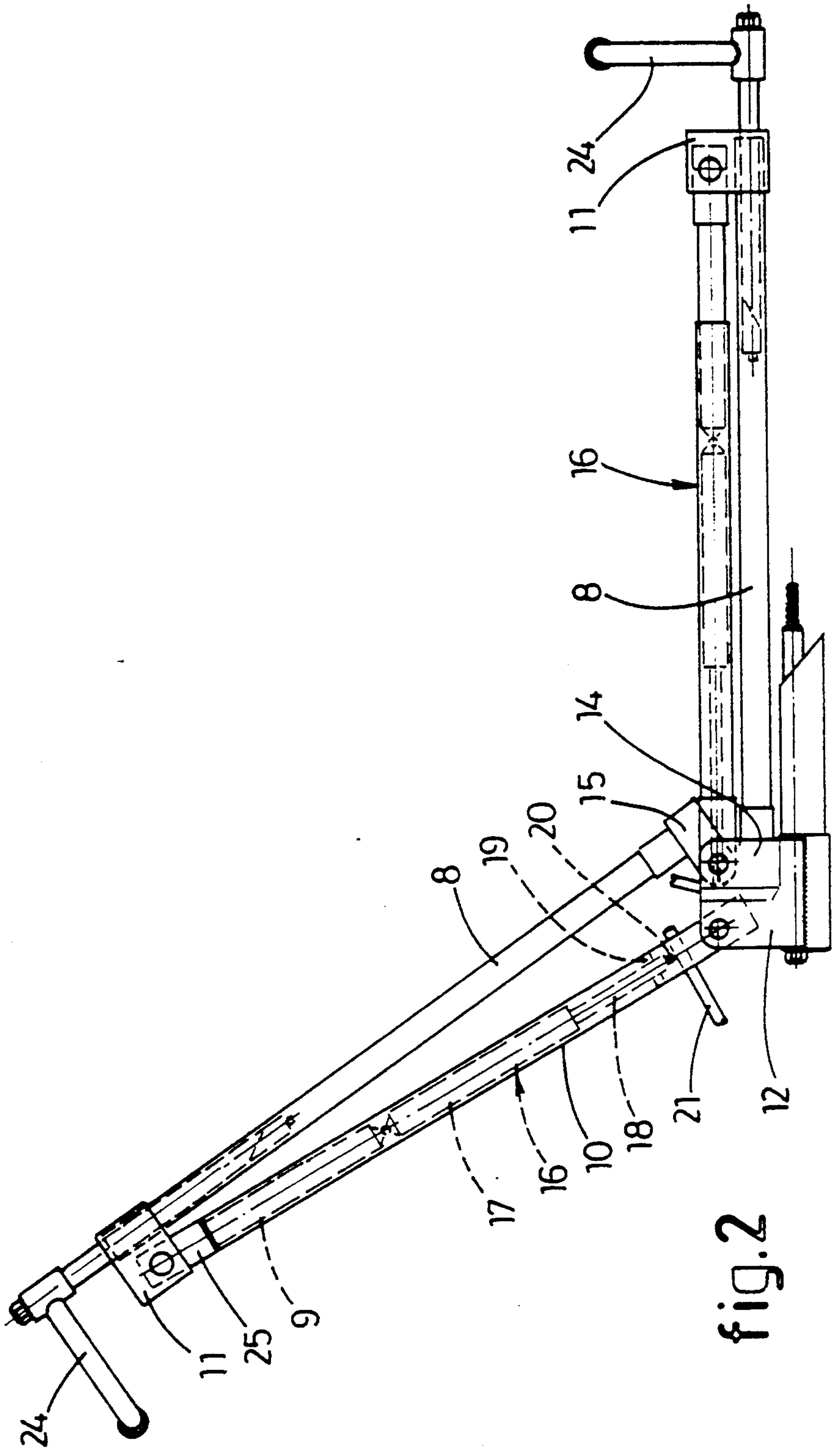
FIG. 2 is a side view of the assembly of support rod, pair of tubes and upper and lower supports, wherein the maximum backwardly inclining position and the fully swung down position are shown.
Figure 3:
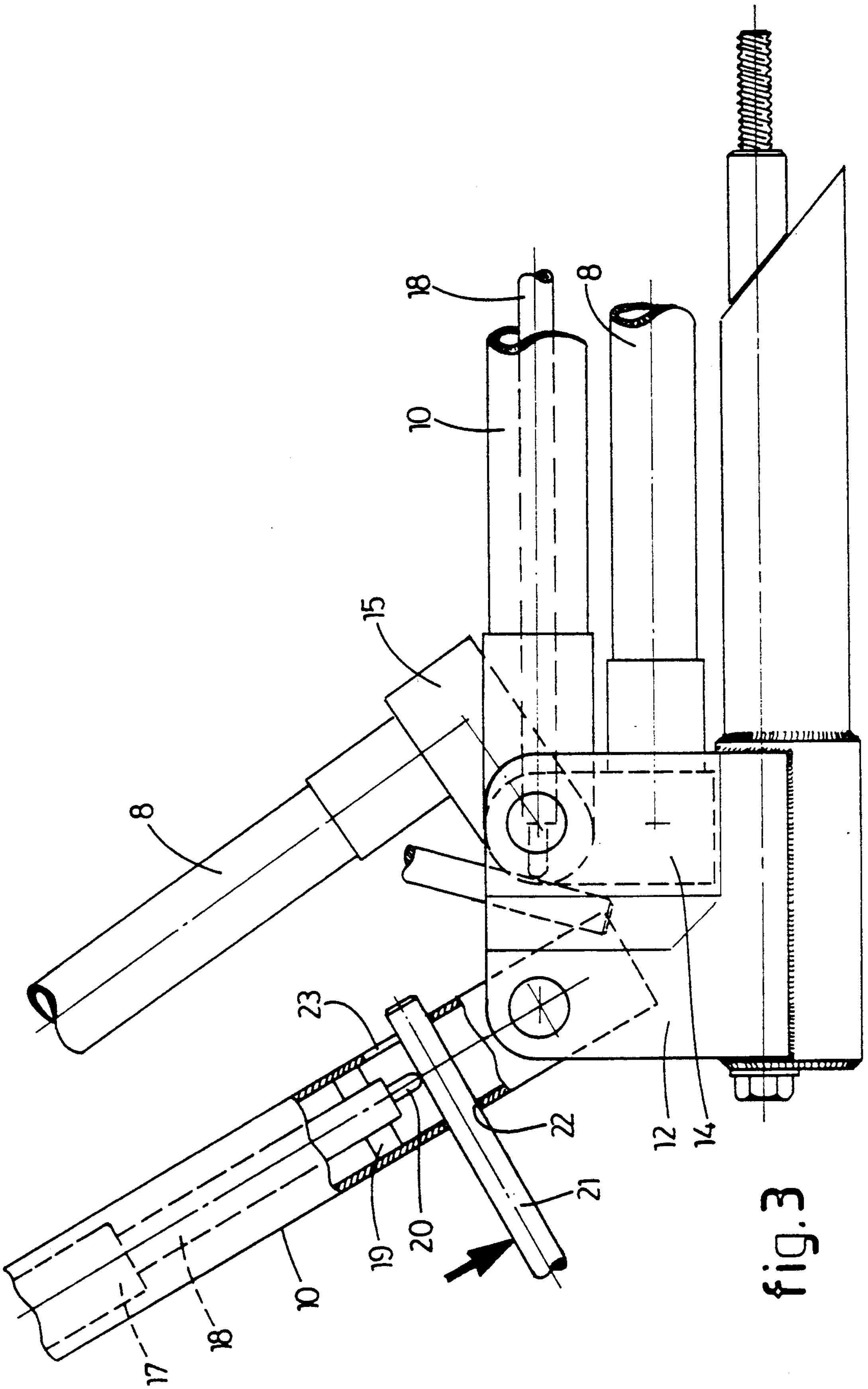
FIG. 3 shows a detail of FIG. 2 at a larger scale.

The lower supports 12 are detachably coupled with side rods 13 of the base frame 1 in a manner known per se as shown in FIG. 2 and 3, so that for example for transporting purposes the backrest 5 with the rod assembly 6 can be detached in a simple manner.

Each pair of tubes 9, 10 comprises an inner tube 9 telescopically slidable in an outer tube 10, wherein the free ends of the pair of tubes 9, 10 are rotatably connected with the upper support 11 and the lower support 12, respectively. The upper support 11 is fixedly connected with the support rod 8. The lower support 12 has a widened part 14 in which the support rod 8 is rotatably connected by means of a U-shaped bracket 15. The distance between the legs of the U-bracket 15 which are rotatably mounted in the support 12, is at least equal to the diameter of the outer tube 10, so that in the fully swung down position of the support rod 8, the pair of tubes 9, 10 will be received between the legs of the U-bracket 15.

A gas spring 16 is mounted within the outer tube 10, the cylinder 17 of the gas spring 16 being connected with the end of the inner tube 9 projecting into the outer tube 10 and the piston rod 18 of the gas spring 16 being fixed in the outer tube 10 be means of a ring 19. The actuating pin 20 of the gas spring 16 presses against an actuating lever 21 which is pivotably supported in the outer tube 10 near its free end.

As shown in FIG. 3, an opening 22 in which the actuating lever 21 fits with some clearance and a slot-like opening 23 are diametrically made in the outer tube 10 to accommodate the actuating lever 21. The position in which the piston rod 18 is fixed in the outer tube 10 by the ring 19, is chosen in such a manner that the actuating pin 20 clamps the actuating lever 21 in both openings 22, 23. If the pair of tubes 9, 10 is mounted with the slot-like opening 23 towards the backrest 5 as shown in the drawings, the actuating pin 20 can be operated and thereby the gas spring 16 can be unlocked by pushing the actuating lever 21 downwardly. It is also possible to mount the pair of tubes 9, 10 between the supports 11, 12 with the slot-like opening 23 directed away from the backrest 5, so that for operating the actuating pin 20 the actuating lever 21 should be lifted.

In the embodiment described the pairs of tubes 9, 10 can also be mounted between the supports 11, 12 with the actuating levers 21 at the upper side, so that the actuating levers 21 are close to the pushing connection rod 24. This alternative embodiment is to be preferred in case of a wheelchair for a patient which is not able to adjust the slope of the backrest 5 himself. The embodiment shown in the drawings is suitable for patients which are still able to actuate the actuating levers 21 for adjusting a desired angle of inclination of the backrest 5.

For a simple operation it is of course to be preferred to connect the levers 21 with each other, for example in the manner as shown in FIG. 1.

The inner tube 9 has at its free end a tube part 25 with a diameter corresponding with the diameter of the outer tube 10. This tube part 25 forms a stop for the outer tube 10, which stop determines the maximum backwardly inclining position of the backrest 5 shown in FIG. 2.

From the foregoing it will be clear that the invention provides a wheelchair, the backrest of which can be easily adjusted in any desired position and can also be fully swung down up on the seat. The gas springs have a double function and are adapted at the one side to lock the support rods in the desired position and at the other side to provide a force during adjusting the backrest. The rod assembly has a simple, robust construction and is made of a minimum plurality of different components. Moreover the rod assembly can be made in different embodiments with this small number of components.

The invention is not restricted to the above described embodiment which can be varied in a number of ways within the scope of the invention.

I claim:

1. A wheelchair comprising a backrest;

a base frame;

a rod assembly connecting said backrest with said base frame, said rod assembly including at both sides of said backrest a support rod pivotably coupled with said base frame for adjusting the angle of inclination of said backrest, upper and lower supports for each said support rod, and a locking means for locking said backrest in a desired position;

wherein said upper and lower supports are fixedly and rotatably connected respectively with the corresponding support rod;

wherein said locking means further includes for each said support rod both a pair of tubes and a gas spring, each said pair of tubes having an inner tube telescopically slidable in an outer tube;

each said inner tube having a first and second end, said inner tube first end being rotatably connected with said upper support of the corresponding support rod;

each said outer tube having a first and second end, said outer tube first end being rotatably connected with said lower support of the corresponding support rod;

each said gas spring having two ends and being mounted in each said outer tube, one end of said gas spring being connected to said inner tube second end and the other end of said gas spring being connected to said outer tube; and wherein each said gas spring further includes an actuating pin, each said actuating pin being operable through an actuating lever pivotably supported in said outer tube.

2. The wheelchair according to claim 1, wherein each said support rod is rotatably connected with said lower support by means of a bracket directed away from the rotatable connection point of the corresponding pair of tubes.

3. The wheelchair according to claim 2, wherein said bracket is U-shaped, the legs of said U-bracket being rotatably connected with said lower support and wherein the legs are spaced from each other a distance at least equal to the diameter of said outer tube.

4. The wheelchair according to claim 2, wherein said inner tube, at said first end, has a tube part with a diameter corresponding with the diameter of said outer tube, where said tube part operates as a stp for determining the sloping end position of said backrest.

5. The wheelchair according to claim 2, wherein each said pair of tubes is adapted to be mounted between said upper and lower supports with the actuating lever disposed proximate said upper support.

6. The wheelchair according to claim 2, wherein each said pair of tubes is adapted to be mounted between said upper and lower supports with the actuating lever disposed proximate said upper support.

7. The wheelchair according to claim 2, wherein said outer tube is provided with a first aperture into which said actuating lever fits with some clearance and a second aperture diametrically opposite said first aperture, wherein said second aperture is configured so as to permit pivotable operation of said actuating lever, wherein each said pair of tubes is adapted to be mounted between said upper and lower supports so that said second aperture is directed away from said backrest.

8. The wheelchair according to claim 2, wherein said outer tube is provided with a first aperture into which said actuating lever fits with some clearance and a second aperture diametrically opposite said first aperture, wherein said second aperture is configured so as to permit privotable operation of said actuating lever, wherein each said pair of tubes is adapted to be mounted between said upper and lower supports so that said second aperture is directed towards said backrest.

9. The wheelchair according to claim 2, wherein each said lower support is detachably coupled to said base frame.

10. The wheelchair according to claim 2, wherein said rod assembly further includes left and right units, each said unit being an assembly of said support rod, said upper support, said lower support and said locking means, wherein said left and right units are physically and functionally equivalent to each other.

11. The wheelchair according to claim 2, characterized in that said actuating levers of said pair of tubes is interconnected with each other.

* * * * *

UNITED STATES PATENT AND TRADEMARK OFFICE

CERTIFICATE OF CORRECTION

PATENT NO. : 5,263,768

DATED : November 23, 1993

INVENTOR(S) : Scheulderman, Petrus J.

It is certified that error appears in the above-indentified patent and that said Letters Patent is hereby corrected as shown below:

Column 4, Line 25, Delete "stp" and insert --stop--;
Column 4, Line 30, Delete "upper" and insert --lower--;
Column 4, Line 49, Delete "privotable" and insert --pivotable--.

Signed and Sealed this

Thirty-first Day of May, 1994

Attest:

BRUCE LEHMAN

*Attesting Officer* — *Commissioner of Patents and Trademarks*